S. W. WEBB.
MECHANISM FOR DETERMINING THE VISCOSITY OF PAPER STOCK.
APPLICATION FILED DEC. 16, 1915.
1,201,402.
Patented Oct. 17, 1916.
2 SHEETS—SHEET 1.
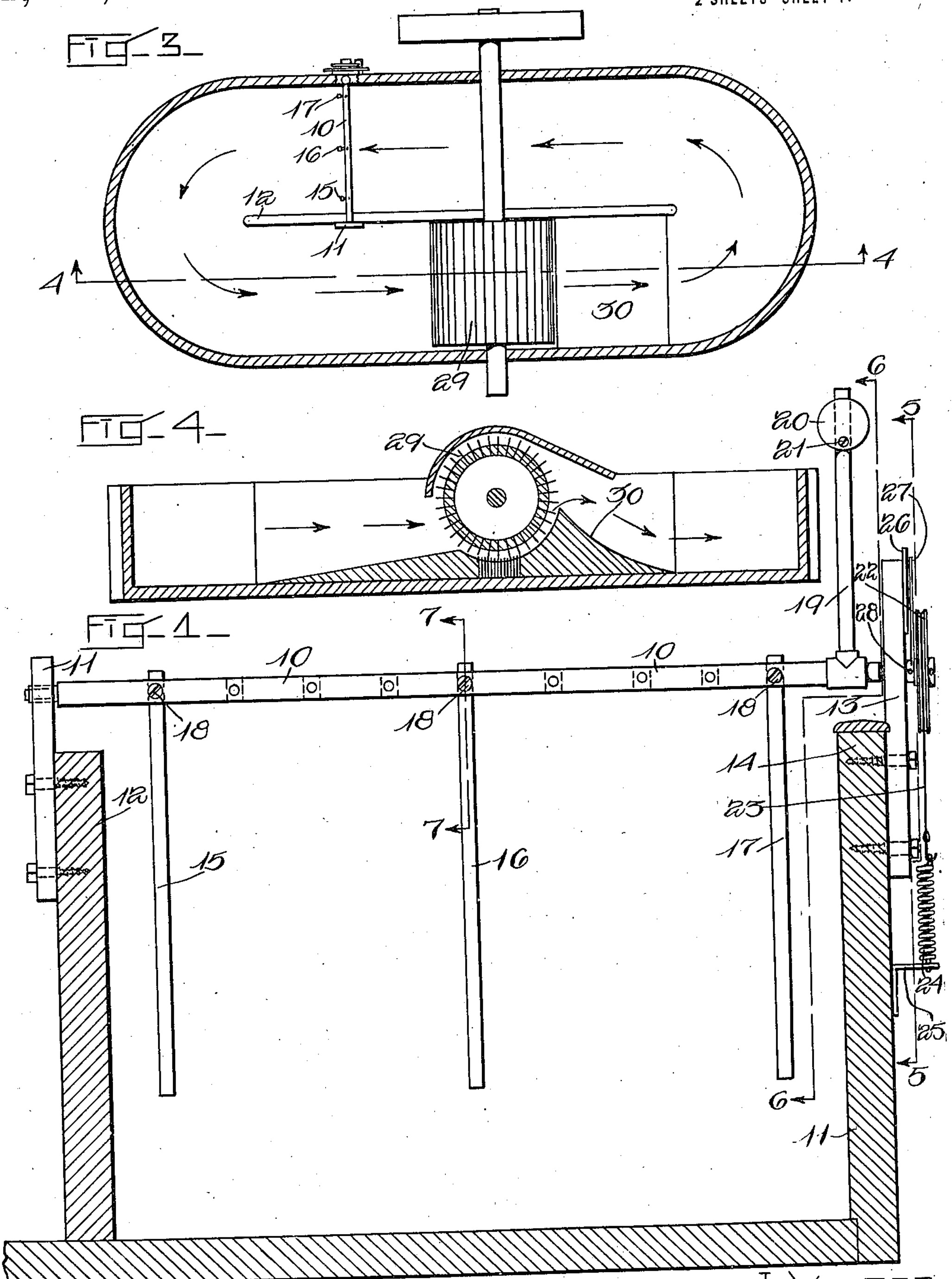
INVENTOR:
STUART W. WEBB
by Wright Brown Quinby May
ATTYS.

S. W. WEBB.
MECHANISM FOR DETERMINING THE VISCOSITY OF PAPER STOCK.
APPLICATION FILED DEC. 16, 1915.
1,201,402. Patented Oct. 17, 1916.
2 SHEETS—SHEET 2.
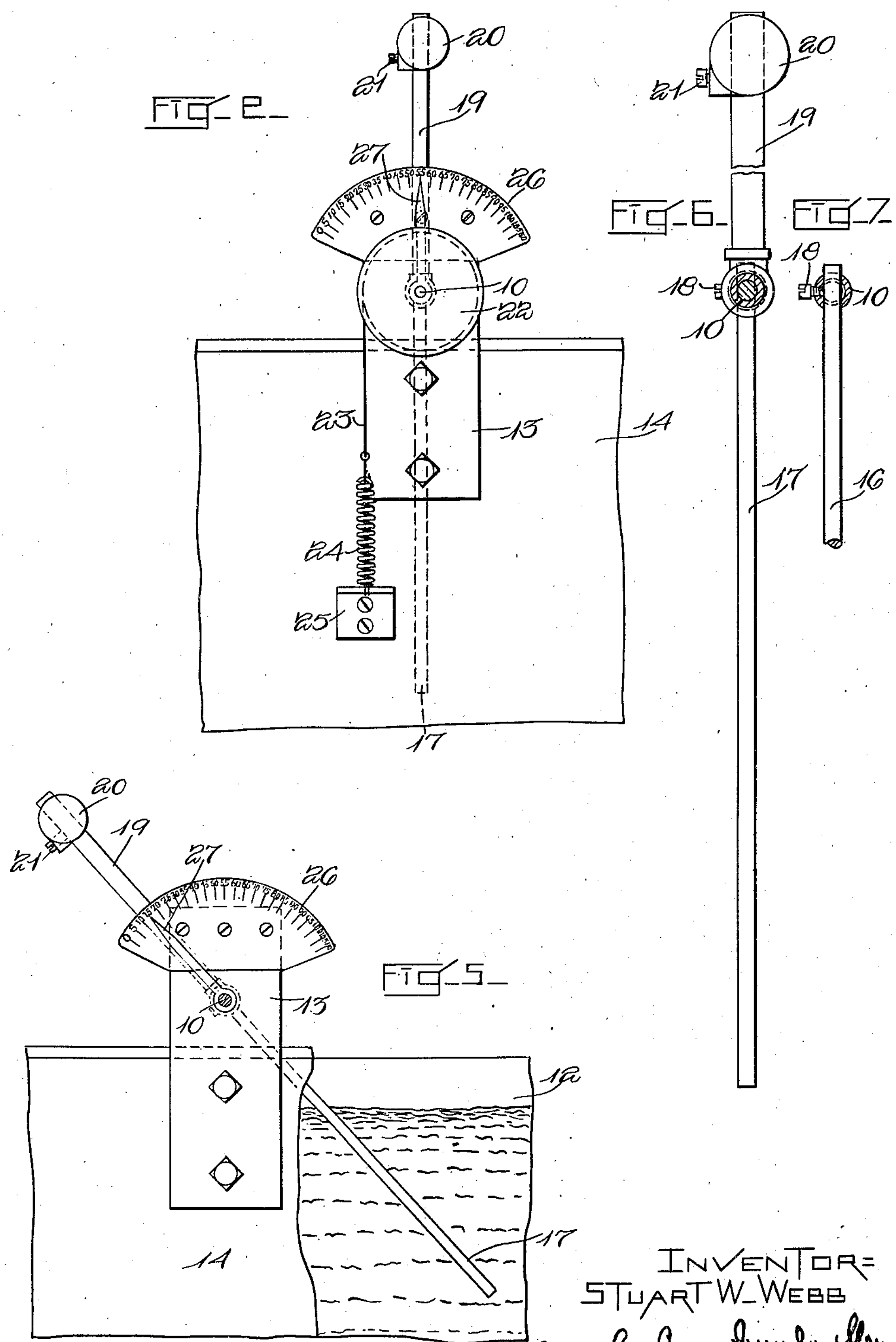

UNITED STATES PATENT OFFICE.

STUART W. WEBB, OF WINCHESTER, MASSACHUSETTS.

MECHANISM FOR DETERMINING THE VISCOSITY OF PAPER-STOCK.

1,201,402. Specification of Letters Patent. Patented Oct. 17, 1916.

Application filed December 16, 1915. Serial No. 67,250.

*To all whom it may concern:*

Be it known that I, STUART W. WEBB, a citizen of the United States, residing at Winchester, in the county of Middlesex and State of Massachusetts, have invented new and useful Improvements in Mechanism for Determining the Viscosity of Paper-Stock, of which the following is a specification.

This invention has relation to devices for measuring the viscosity of given bodies, and has more particularly for its object the provision of a simple mechanism for determining the average viscosity of paper stock as it is undergoing the beating operation, to enable the operator to produce stock of a given viscosity or density.

It has heretofore been proposed to measure the viscosity of paper stock by the employment of a relatively large lemon-shaped drag pendant in the path of the paper stock, and of indicating mechanism connected therewith as shown in the patent to A. B. Green, No. 1,125,017. Paper stock, however, is apt to vary in density and viscosity. That is, as the stream of stock travels around the midfeather of the beater and through the beating instrumentalities, certain portions of the stock vary from each other, doubtless due to the fact that the center of the stream tends to travel more rapidly than the sides which are contiguous to the walls of the tub and which are retarded by frictional engagement therewith, and therefore become beaten or disintegrated to a greater extent. Hence, when a measuring drag is located at only one point in the stream, as in the middle for instance, it is difficult to determine the average viscosity of the entire body of paper stock.

My invention, as previously stated, has for its main object to measure the average viscosity of the paper stock, and I accomplish this by placing across the path of the flowing stream thereof a plurality of movable drags, no one of which presents a large frictional area to the stream, and all of which are connected to a suitable measuring device, so that the latter is actuated or operated by the conjoint action of all of the drags.

On the accompanying drawings, Figure 1 represents in cross section a portion of a beater, equipped with a device or mechanism embodying my invention. Fig. 2 represents a side elevation of the same. Figs. 3 and 4 show on a small scale a beater with my device attached thereto, Fig. 3 reperesenting a plan view and Fig. 4 representing a section on the line 4—4 of Fig. 3. Fig. 5 represents a section on the line 5—5 of Fig. 1, showing the drags being moved to an inclined position by the screen of the stock. Fig. 6 represents a section on the line 6—6 of Fig. 1. Fig. 7 represents a section on the line 7—7 of Fig. 1.

Referring to the drawings, 10 represents a shaft, one end of which is journaled in a bracket 11, secured to the midfeather 12 of the beater, and the other end of which is journaled in a bracket 13 secured to the outer wall 14 of the beater. The shaft has near its middle and at points near its ends three diametric apertures in which are inserted the pendant rods 15, 16 and 17. These rods perform the function of drags, one being arranged in each of the relatively sluggish portions of the stream of stock and the other being arranged in the central or relatively rapidly-flowing portion of the stream. Of course I may increase the number of the rods, if desired. Each rod is longitudinally adjustable, and may be secured in its receiving aperture after adjustment by a set screw 18, and it may be located in different apertures formed in the shaft, so that it may be adjusted longitudinally of the shaft.

There is secured to the shaft an upstanding arm 19, on which is adjustably secured a counterweight 20. To permit its adjustment, the weight is apertured to receive the arm, and after adjustment is secured to said arm by a set-screw 21. The weight is small enough, and is so adjusted that normally the drags will hang vertically. A spring could be employed instead of the counterweight.

On the projecting end of the shaft 10, there is a peripherally grooved wheel or segment 22, which is secured in place by a set screw, so that it may be rotatively adjustable thereon, and tracking on the wheel is a cord, wire or other flexible member 23. One end of the cord is secured to the wheel and the other is attached to one end of a helical tension spring 24. Said spring is attached at its lower end to an angle plate 25 and yieldingly resists the rotation of the shaft 10. For indicating the rotative movement of the shaft, I secure to the bracket 13 a scale plate 26 having a graduated scale thereon, and adjustably attach to the shaft an index 27. The hub of the index is secured to the shaft by a set screw 28, and may be rotatively adjusted thereon. A recording mechanism may be employed, if desired, such for example as shown in Letters Patent to Green previously referred to herein.

In Figs. 4 and 5, I have shown an ordinary beater for paper stock, comprising a tube having the usual midfeather, and the beater 29, and back fall 30 by which the stream of stock is caused to flow in a continuous stream in the tub around the midfeather. The beater tub is exposed to atmospheric pressure, as usual, and the extent to which the drags will be rocked about their common axis will vary with the friction of the stock against the surfaces of the drags with the internal friction of the stock and the speed of rotation of the stock. As the viscosity of a given mass decreases, under the action of the beater, the drags will gradually swing toward a vertical position. The operator, therefore, will be provided with means for determining the viscosity of the stock at all times during its treatment, and to know when the optimum condition of viscosity has been obtained.

The operator will be able to measure or determine not only the viscosity of the stock, which varies with the strength of the fiber and its "slowness" (*i. e.* the relative extent to which the water is able to drip or flow from the web of stock on the carrier) but also the density of the stock, and the speed of movement of the stock in the tub, which latter is dependent on the density of the stock and the lifting power of the beater roll, all of which conditions must be taken into consideration in preparing the stock for paper making. The treatment of the stock may then be varied by adjusting the roll relatively to the bed plate, and the proportion of water to raw stock may likewise be varied, all in accordance with the usual practice, to produce a uniform product.

Having thus explained the nature of my said invention and described a way of making and using the same, although without attempting to set forth all of the forms in which it may be made or all of the modes of its use, what I claim is:

1. In an apparatus for measuring the viscosity or density of paper stock during a beating operation, the combination with a beater tub and a beater which causes a continuous flow of the paper stock through the tub, of a series of drags arranged across and immersed in different portions of the stream and capable of limited movement with the stream of the stock, an indicator, and means operated by the conjoint action of the drags for actuating the indicator.

2. In an apparatus for measuring the viscosity or density of paper stock during a beating operation, the combination with a beater tub and a beater which causes a continuous flow of the paper stock through the tub, an indicator, a rock shaft arranged across the stream of stock and connected to the indicator, drags attached to said shaft and immersed in said stream of stock at points near the middle and near the sides thereof, and a spring connected to said rock shaft and arranged to resist yieldingly the movement of the drags due to the frictional engagement therewith of the moving mass of stock.

3. In an apparatus for measuring the viscosity or density of paper stock during a beating operation, the combination with a beater tub and a beater which causes a continuous flow of the paper stock through the tub, a rock shaft arranged across the stream of stock, a series of drags dependent from said shaft and having their lower ends immersed in laterally separated portions of the stock, a graduated scale, an index on said shaft movable along said scale, a wheel on said shaft, a spring attached stationarily at one end, and a flexible member secured to the other end of the spring and also secured to and tracking on said wheel.

In testimony whereof I have affixed my signature.

STUART W. WEBB.